Aug. 29, 1967      P. ARPIN      3,338,041
MOBILE FRUIT AND NUT HARVESTING APPARATUS
Filed Sept. 8, 1964      2 Sheets-Sheet 1
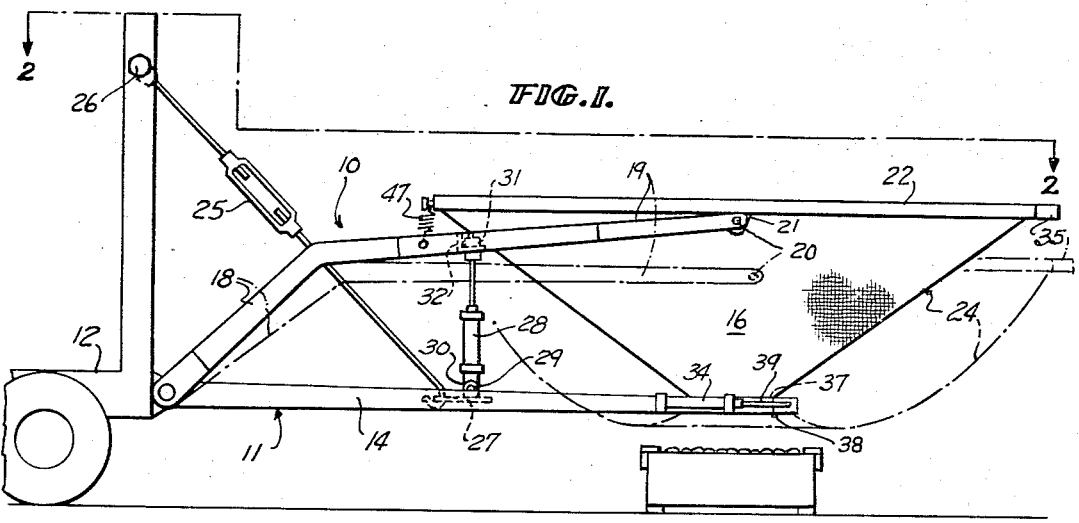
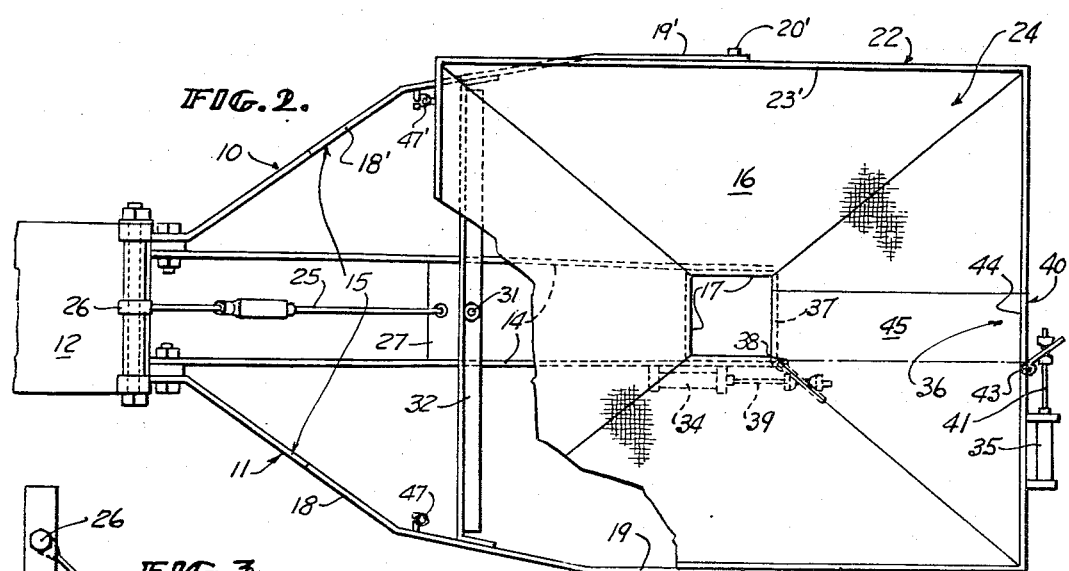
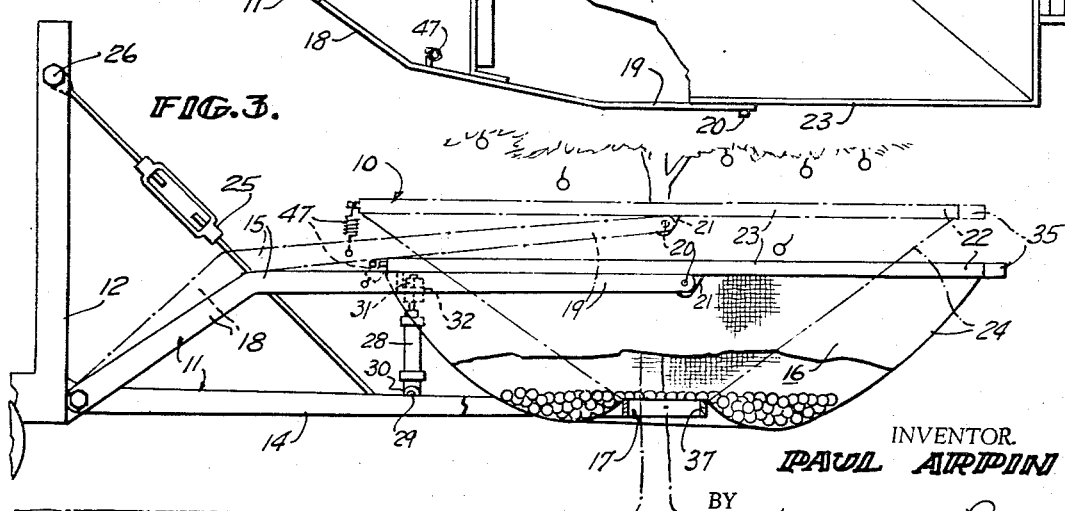
INVENTOR.
PAUL ARPIN
BY
Hansen and Lane
HIS ATTORNEYS.

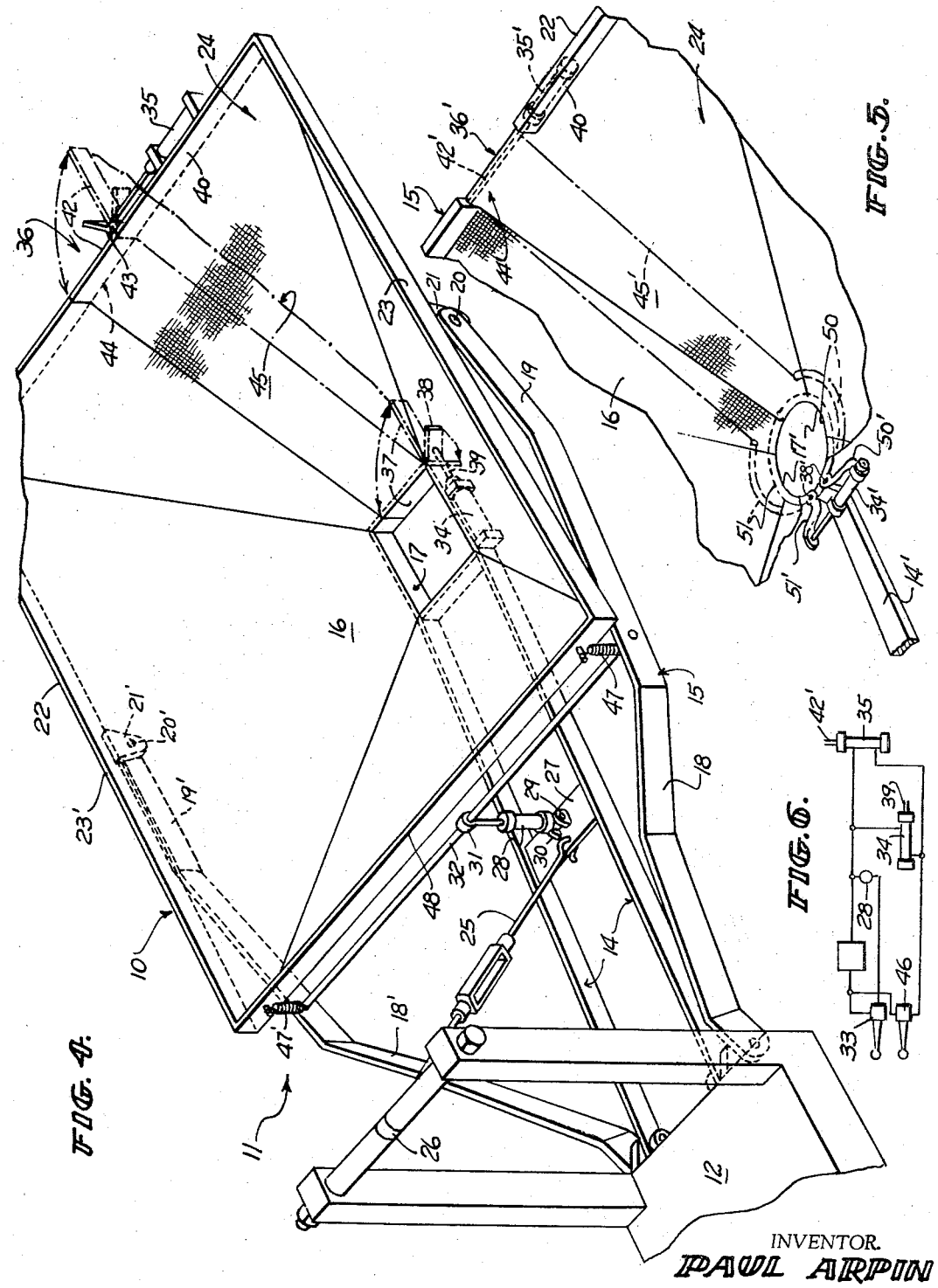

United States Patent Office 3,338,041
Patented Aug. 29, 1967

3,338,041
MOBILE FRUIT AND NUT HARVESTING
APPARATUS
Paul Arpin, 2905 Almaden Road, Apt. 22,
San Jose, Calif. 95125
Filed Sept. 8, 1964, Ser. No. 394,750
6 Claims. (Cl. 56—329)

This invention relates to a mobile fruit and nut harvesting apparatus and more particularly to an apparatus for catching falling fruit and/or nuts, to collect and hold them and for subsequently discharging them into a receptacle.

The invention resides in a mobile apparatus capable of being maneuvered about an orchard and into a position beneath a tree for the purpose of catching and collecting fruit falling therefrom and for carrying the fruit to a place of discharge.

It is an object of this invention to provide in such an apparatus a means for holding the fruit collected until the apparatus with fruit collected can be moved away from the tree for later discharge into a standard receptacle.

Another object of this invention is to provide a hopper type cone for catching the fruit with a novel frame and support therefor to render the cone openable to embrace the trunk of a tree and for bagging the cone during catching of the fruit and means for tautening the cone so the fruit will discharge by gravity through the bottom of the cone.

These and other objects and advantages of the present invention will become apparent from a reading of the following description in the light of the accompanying two sheets of drawings in which:

FIG. 1 is a side elevation of the apparatus of the present invention.
FIG. 2 is a plan view of FIG. 1.
FIG. 3 is a view similar to that of FIG. 1 with parts thereof in a different position.
FIG. 4 is a perspective view of the apparatus shown in FIGS. 1, 2 and 3.
FIG. 5 is a modification of a portion of FIG. 4.
FIG. 6 schematically shows a hydraulic system employed in the apparatus.

Referring to the drawings the apparatus generally designated 10 comprises a frame 11 adapted to be hitched or attached to a conventional carrier such as a fork lift and the like. The frame 11 is mounted on a stationary base 12 constructed for ready connection to the forks of a fork lift vehicle 13. The frame 11 consists of a pair of arms 14 and 15 movable toward and from each other to change the draping of a fabric membrane 16 supported between them.

One arm 14 extends from the stationary base 12 and terminates in a loop 17 of a size to encompass the trunk of a tree. The other arm 15 consists of parallel arms 18–18' pivotally connected to the base 12 for movement in unison relative to the latter and the arm 14. The arms 18–18' extend from the base in yoke-like fashion and have their ends 19–19' spread and pivotally connected as at 20–20' to depending ears 21–21' on the sides of a hoop 22 the spread or girth of which is slightly greater than the spread of the limbs of a fruit tree.

In the present disclosure I have shown the hoop 22 to be in the form of a quadrangle having the ears 21–21' secured to its sides 23–23' diametrically opposite each other on an imaginary line extending through the center of the loop 17 on the end of the arm 14.

The fabric membrane 16 is canvas having its perimeter removably attached to the hoop 22 and its center secured to the loop 17 which embraces a tree.

The arrangement is such that the loop 17 and the hoop 22 are maintained substantially parallel to each other in a horizontal plane while being movable toward and from each other vertically. The canvas membrane 16 is thus stretched into a pyramid or cone shaped hopper 24 when the arms 14 and 15 are separated to their limit of movement away from each other. However when the arms 14 and 15 are moved toward each other, for example as shown in solid lines in FIG. 3 the sides of the canvas cone or pyramid curve out to provide a bag like receptacle for catching and collecting fallen fruit.

As illustrated in the drawings the arm 14, which is lowermost, is disposed to extend forwardly from the base 12. To this end the arm 14 is braced by a bracket or tie rod 25 extending diagonally between the arm 14 and a portion 26 of the stationary base 12. The arm 14 includes a cross brace 27 to which the tie rod 25 is secured. A hydraulic ram 28 has one end pivotally connected as at 29 to a pair of ears 30 on the cross brace 27. The opposite end of the ram 28 is pivotally connected as at 31 to a cross bar 32 which extends between the parallel arms 18–18' of the uper arm 15 and secured thereto as by welding and the like.

The hydraulic ram 28 is controlled by a conventional manually operated valve 33 to change the position of the arms relative to each other for the purposes hereinbefore mentioned. Other hydraulically operated mechanism involved include a pair of hydraulic pistons 34 and 35 for operating a gate 36 in the cone shaped canvas hopper 24 for the purpose of admitting the trunk of a tree into the central loop 17 thereof.

The central loop 17 has a portion 37 thereof pivotally mounted as at 38 for opening and closing the loop. The portion 37 is connected to the rod 39 at one end of the hydraulic piston 34 the latter of which is fixedly mounted on the arm 14. The other piston 35 is mounted on the forward side 40 of the hoop 22 and has its piston rod 41 connected to a portion 42 of side 40. The portion 42 is pivotally mounted on the side 40 as at 43 and is adapted to swing into and out of alignment with the side 40 to open and close a gap 44 therein. The gap 44 is disposed along the longitudinal axis of the apparatus so that both portions 37 and 42 provide the gate 36 in the hopper. The canvas membrane 16 is separated along its forward pyramidal side to provide one flap 45 which is secured to the gate portions 37 and 42 for movement therewith. The hydraulic pistons 34 and 35 are in one hydraulic system controlled by a single valve 46 so that the gate portions 37 and 42 move in unison between open and closed positions as desired.

The upper hoop 22 is counter balanced relative to the ends 19–19' of the arm 15 to maintain the hoop 22 in substantially horizontal position at all times. In this connection it will be noted that by reason of the hydraulic piston 35 and gate mechanism 42 being mounted on the forward side 40 of the hoop 22 there is a tendancy for the latter to tilt toward the forward side. However, springs 47 each having one end connected to the aft side 48 of the hoop and their opposite ends connected to the cross bar 32 beneath or to brackets extending inwardly of the arms 18–18', serve to counter balance the hoop 22 to keep it substantially horizontal.

In the modification shown in FIG. 5, like parts are indicated by like reference numerals except that these numerals distinguish from parts of FIG. 4 by prime exponents. In FIG. 5 the loop 17' is shown as a pair of semi-circular claw arms 50–51 each pivotally connected to the end of the arm 14' and having counterarms 50'–51' on the opposite side of the pivots 38' thereof. The hydraulic ram 34' has its ends pivotally connected to the respective counterarms 50'–51' to open and close the loop 17' formed by the claw arms 50 and 51.

On the upper hoop 22 the gap 44 is opened and closed by means of the rod 42' of the hydraulic piston 35'. The flap portion 45' of the canvas carried by the rod 42' is loosely mounted thereon except at the very end of the rod 42'. Therefore as the rod 42' moves across the gap 44 the canvas flap is drawn to closed condition and when the rod 42' is withdrawn from the gap 44 the canvas gathers into a pleated condition to open the gate 36'.

In résumé the operation of the apparatus is as follows:

The apparatus with its base 12 secured to the carrier of a tractor, fork lift or the like is disposed to extend forwardly therefrom for movement in and about an orchard. With the gate 36 open a sizeable slit is provided in the forward zone of the canvas hopper 24 so that the latter can be moved into a position beneath a tree. When the trunk of the tree is embraced within the central loop 17 and the entire apparatus at rest the gate 36 is closed by means of the hydraulic pistons 34 and 35. The upper and lower arms 14 and 15, respectively, are then disposed in parallelism with respect to each other as illustrated in FIG. 3 so that the lower end of the canvas membrane 16 will bag out as shown. The tree is usually shaken in any well known manner to cause the fruit to fall. The perimeter of the upper hopper 22 is disposed to catch any and all fruit and/or nuts as they fall from the tree. As the fruit falls and lands upon the canvas membrane 16 the fruit will gravitate to the bagged out lower end of the hopper 24. The relative depth of the bagged out lower end of the hopper 24 can be adjusted by movement of the arms 14 and 15 closer to each other by means of the hydraulic ram 28. In this manner collection of all the fruit falling from the tree is assured in the bagged out hopper 24 and below the central loop 17, regardless of the size of the crop.

When all the fruit harvested has been collected in the bagged out hopper which sags below the loop 17 the gate 36 is opened to allow the apparatus to be removed from below the tree. When the apparatus is clear of the tree and the gate 36 again closed and a box or receptacle placed beneath the lower central loop 17 the arms 14 and 15 are moved relatively away from each other to stretch the canvas membrane between the loop 17 and hoop 22. Thus as shown in FIG. 1 the canvas hopper becomes a chute from which the fruit collected will fall by gravity through the restricted open bottom, i.e., loop 17, into receptacles such as lug boxes and the like for delivery to a processing plant.

I claim.

1. In combination with a mobile apparatus for catching and collecting fruit falling from a tree, a frame having upper and lower arms movable toward and from each other, a hopper on said frame comprising a hoop on the upper one of said arms having a girth substantially comparable to the spread of the limbs of such tree, a loop on the lower one of said arms and openable for embracing the trunk of such tree, gate means on said hoop radially outward from said loop for passage of a tree trunk, a pliable membrane supported between said hoop and said loop and openable between said loop and said gate means, and means for moving said arms toward each other for sagging said membrane in the region of said loop during catching and collecting of said fruit and for subsequently moving said arms away from each other for stretching said mambrane into a cone-shaped hopper to thereby discharge the collected fruit by gravity through the loop on said lower one of said arms.

2. In a mobile fruit and nut harvesting apparatus including a hopper adapted to be supported below a tree for catching and collecting fruit falling from such tree comprising the combination therewith of upper and lower arms supported for movement toward and from each other, a hopper supported between said upper and lower arms comprising a hoop on the upper one of said arms adapted to encompass the spread of the limbs of such tree, a loop on the lower one of said arms adapted to embrace the trunk of such tree, a membrane supported between said hoop and said loop to form said hopper, gate means in said loop and said hoop and radially of said membrane facilitating movement of said hopper relative to a tree trunk, and means for moving said arms relatively with respect to each other for sagging said membrane in the region of said loop during catching and collecting of said fruit and for subsequently stretching said membrane into a cone-shaped hopper for discharging the collected fruit by gravity through the loop on said lower one of said arms.

3. In a mobile fruit and nut harvesting apparatus for catching and collecting fruit falling from a tree comprising a lower arm having a loop formed on one end thereof, upper arms mounted for movement toward and from said lower arm, a hoop supported on said upper arm encompassing the spread of the limbs of said tree, means on said loop for opening and closing the same for embracing the trunk of such tree, a gate on said hoop radially outward from said loop for passage of such tree trunk, a membrane supported between said hoop and said loop, and means for moving said arms relatively with respect to each other for sagging said membrane about said loop during catching and collecting of said fruit and for stretching said membrane into a cone-shaped hopper for discharging the collected fruit by gravity through the loop on said lower one of said arms.

4. In a mobile fruit and nut harvesting apparatus the combination with a flexible hopper for catching and collecting fruit falling from a tree, a base attachable to a vehicle, a hoop for supporting the upper edge portion of said hopper below the spread of the limbs of such tree, a loop secured to the lower open end of said hopper and openable for receiving and embracing the trunk of such tree, a lower arm extending forwardly from said base for supporting said loop, upper arms pivotally mounted on said base having their outer ends pivotally secured to said hoop, gate means on said hoop radially outward from said openable loop, said hopper having an overlapping flap between said openable loop and said gate means for admitting a tree trunk into and out of said loop, hydraulic means for opening and closing said openable loop and said gate means simultaneously and hydraulic means between said lower and upper arms for moving said arms relatively with respect to each other for sagging said hopper in the region of said loop during catching and collecting of said fruit and for stretching said hopper into cone-shape for discharging the collected fruit by gravity through the loop on said lower one of said arms.

5. In a mobile fruit and nut harvesting apparatus the combination with a membrane in the form of a hopper for catching and collecting fruit falling from a tree, a base attachable to a vehicle, means for supporting said hopper comprising a hoop having a girth comparable to the spread of the limbs of such tree for supporting the upper edge portion of said mambrane, a loop secured to the lower open end of said membrane adapted to embrace the trunk of such tree, a lower arm extending forwardly from said base, means for supporting said loop at the extreme end of said lower arm, upper arms pivotally mounted on said base and having their outer ends pivotally secured to the sides of said hoop, means for maintaining said hoop and said loop substantially parallel in a horizontal plane for sagging said membrane in the region of said loop during catching and collecting fruit and movement of said hopper relative to a tree trunk, and hydraulic means between said lower and upper arms for moving said arms relatively with respect to each other for subsequently stretching said membrane into cone-shape hopper for discharging the fruit therefrom by gravity through the loop at the open bottom of said hopper.

6. In a mobile fruit and nut harvesting apparatus the combination with a membrane in the form of a hopper for catching and collecting fruit falling from a tree, a base attachable to a vehicle, a hoop having a girth comparable to the spread of the limbs of such tree for supporting the upper edge portion of said membrane beneath such limbs, a loop secured to the lower open end of said membrane adapted to embrace the trunk of such tree, a lower arm extending forwardly from said base for supporting said loop, upper arms pivotally mounted on said base having their outer ends pivotally secured to the sides of said hoop, gate means in said loop and said hoop diametrically opposite said base for admitting a tree into said loop, means for opening and closing said gate means, means for stabilizing said hoop in horizontal parallelism with said loop and for sagging said membrane below said loop during catching and collecting of said fruit and during holding of said fruit upon opening of said gate means and removal of such sagging membrane from beneath a tree, and hydraulic means between said lower and upper arms for moving said arms relatively with respect to each other for stretching said membrane into a cone-shaped hopper upon closing of the latter for discharging the collected fruit into a receptacle by gravity through the open end of said membrane and the loop supporting the latter.

References Cited
UNITED STATES PATENTS

| | | | |
|---|---|---|---|
| 1,520,129 | 12/1924 | Hedeen | 56—329 |
| 1,626,068 | 4/1927 | Bartlett | 56—329 X |
| 2,602,279 | 7/1952 | Leighton | 56—329 |
| 2,714,281 | 8/1955 | Steele | 56—329 |

ABRAHAM G. STONE, *Primary Examiner.*

RUSSELL R. KINSEY, *Examiner.*